(12) United States Patent
Holmer et al.

(10) Patent No.: US 9,210,302 B1
(45) Date of Patent: Dec. 8, 2015

(54) SYSTEM, METHOD AND APPARATUS FOR MULTIPOINT VIDEO TRANSMISSION

(75) Inventors: Stefan Holmer, Hagersten (SE); Henrik Fahlberg Lundin, Sollentuna (SE); Patrik Westin, Stockholm (SE)

(73) Assignee: GOOGLE INC., Mountain View, CA (US)

( * ) Notice: Subject to any disclaimer, the term of this patent is extended or adjusted under 35 U.S.C. 154(b) by 303 days.

(21) Appl. No.: 13/206,791

(22) Filed: Aug. 10, 2011

(51) Int. Cl.
| | |
|---|---|
| H04N 7/50 | (2006.01) |
| H04N 5/14 | (2006.01) |
| H04N 19/10 | (2014.01) |
| H04N 19/102 | (2014.01) |
| H04N 19/103 | (2014.01) |
| H04N 19/30 | (2014.01) |
| H04N 19/37 | (2014.01) |
| H04N 19/63 | (2014.01) |

(52) U.S. Cl.
CPC .............. *H04N 5/147* (2013.01); *H04N 19/10* (2014.11); *H04N 19/102* (2014.11); *H04N 19/103* (2014.11); *H04N 19/30* (2014.11); *H04N 19/37* (2014.11); *H04N 19/63* (2014.11)

(58) Field of Classification Search
CPC .............. H04N 7/50; H04N 19/00733; H04N 19/00684; H04N 19/00715; H04N 19/00781
USPC ............................ 375/240; 370/260; 382/238
See application file for complete search history.

(56) References Cited

U.S. PATENT DOCUMENTS

| | | |
|---|---|---|
| 338,127 A | 4/1968 | Stark et al. |
| 5,778,082 A | 7/1998 | Chu et al. |
| 5,801,756 A | 9/1998 | Iizawa |
| 5,914,949 A | 6/1999 | Li |
| 5,936,662 A | 8/1999 | Kim et al. |

(Continued)

FOREIGN PATENT DOCUMENTS

| | | |
|---|---|---|
| WO | WO2008066593 | 6/2008 |
| WO | WO2010059481 | 5/2010 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Geepy Pe
*Assistant Examiner* — Berteau Joisil
(74) *Attorney, Agent, or Firm* — Young Basile Hanlon & MacFarlane P.C.

(57) ABSTRACT

Disclosed herein is a method of transmitting a video bitstream to a first and at least a second endpoint with varying bandwidth capacities including identifying bandwidth capacities of the first and second endpoints, the second endpoint having less bandwidth capacity than the first endpoint, encoding at least a portion of the video bitstream to generate at least one version of a first data partition and a plurality of versions of at least a second data partition, the plurality of versions of the second data partition including at least one high quality version and at least one low quality version of the second data partition, transmitting the at least one version of the first partition and the at least one high quality version of the second partition to the first endpoint and transmitting the at least one low quality version of the second partition to the second endpoint.

20 Claims, 5 Drawing Sheets

(56) References Cited

U.S. PATENT DOCUMENTS

| | | | |
|---|---|---|---|
| 5,953,050 A | 9/1999 | Kamata et al. | |
| 5,963,547 A * | 10/1999 | O'Neil et al. | 370/260 |
| 6,011,868 A | 1/2000 | van den Branden et al. | |
| 6,028,639 A | 2/2000 | Bhatt et al. | |
| 6,072,522 A | 6/2000 | Ippolito et al. | |
| 6,163,335 A | 12/2000 | Barraclough | |
| 6,453,336 B1 | 9/2002 | Beyda et al. | |
| 6,603,501 B1 | 8/2003 | Parry et al. | |
| 6,614,936 B1 * | 9/2003 | Wu et al. | 382/238 |
| 6,621,514 B1 | 9/2003 | Hamilton | |
| 6,658,618 B1 | 12/2003 | Gu et al. | |
| 6,757,259 B1 | 6/2004 | Hamilton | |
| 6,775,247 B1 | 8/2004 | Shaffer et al. | |
| 6,795,863 B1 | 9/2004 | Doty, Jr. | |
| 6,941,021 B2 | 9/2005 | Goldstein et al. | |
| 6,992,692 B2 | 1/2006 | Gu et al. | |
| 7,007,098 B1 | 2/2006 | Smyth et al. | |
| 7,084,898 B1 | 8/2006 | Firestone et al. | |
| 7,123,696 B2 | 10/2006 | Lowe | |
| 7,133,362 B2 | 11/2006 | Chu et al. | |
| 7,143,432 B1 | 11/2006 | Brooks et al. | |
| 7,206,016 B2 | 4/2007 | Gu | |
| 7,253,831 B2 | 8/2007 | Gu | |
| 7,321,384 B1 | 1/2008 | Wu et al. | |
| 7,349,944 B2 | 3/2008 | Vernon et al. | |
| 7,352,808 B2 | 4/2008 | Ratakonda et al. | |
| 7,477,282 B2 | 1/2009 | Firestone et al. | |
| 7,558,221 B2 | 7/2009 | Nelson et al. | |
| 7,593,031 B2 | 9/2009 | Root et al. | |
| 7,619,645 B2 | 11/2009 | Cockerton | |
| 7,627,886 B2 | 12/2009 | Barbanson et al. | |
| 7,646,736 B2 | 1/2010 | Yang et al. | |
| 7,664,057 B1 | 2/2010 | Wu et al. | |
| 7,698,724 B1 | 4/2010 | Day | |
| 7,707,247 B2 | 4/2010 | Dunn et al. | |
| 7,716,283 B2 | 5/2010 | Thukral | |
| 7,759,756 B2 | 7/2010 | Lee et al. | |
| 7,856,093 B2 | 12/2010 | Fujimori et al. | |
| 7,864,251 B2 | 1/2011 | Gu et al. | |
| RE42,288 E | 4/2011 | Degioanni | |
| 7,920,158 B1 | 4/2011 | Beck et al. | |
| 7,973,857 B2 | 7/2011 | Ahmaniemi et al. | |
| 7,987,492 B2 | 7/2011 | Liwerant et al. | |
| 8,010,652 B2 | 8/2011 | Wang et al. | |
| 8,060,608 B2 | 11/2011 | Wang et al. | |
| 8,117,638 B2 | 2/2012 | Perlman | |
| 8,164,618 B2 | 4/2012 | Yang et al. | |
| 8,228,982 B2 | 7/2012 | Qian et al. | |
| 8,264,521 B2 | 9/2012 | Triplicane et al. | |
| 8,265,168 B1 | 9/2012 | Masterson et al. | |
| 8,276,195 B2 | 9/2012 | Hegde et al. | |
| 8,379,677 B2 | 2/2013 | Leung et al. | |
| 8,527,649 B2 | 9/2013 | Wexler et al. | |
| 8,549,571 B2 | 10/2013 | Loher et al. | |
| 2001/0042114 A1 | 11/2001 | Agraharam et al. | |
| 2002/0033880 A1 | 3/2002 | Sul et al. | |
| 2002/0118272 A1 | 8/2002 | Bruce-Smith | |
| 2003/0091000 A1 | 5/2003 | Chu et al. | |
| 2003/0160862 A1 | 8/2003 | Charlier et al. | |
| 2004/0119814 A1 | 6/2004 | Clisham et al. | |
| 2005/0008240 A1 | 1/2005 | Banerji et al. | |
| 2005/0062843 A1 | 3/2005 | Bowers et al. | |
| 2005/0140779 A1 | 6/2005 | Schulz et al. | |
| 2006/0023644 A1 | 2/2006 | Jang et al. | |
| 2006/0164552 A1 | 7/2006 | Cutler | |
| 2007/0005804 A1 | 1/2007 | Rideout | |
| 2007/0035819 A1 | 2/2007 | Bahatt et al. | |
| 2007/0081794 A1 * | 4/2007 | Baynger et al. | 386/112 |
| 2007/0120971 A1 | 5/2007 | Kennedy | |
| 2007/0127671 A1 | 6/2007 | Chua et al. | |
| 2007/0200923 A1 | 8/2007 | Eleftheriadis et al. | |
| 2007/0206091 A1 | 9/2007 | Dunn et al. | |
| 2007/0280194 A1 | 12/2007 | Wu et al. | |
| 2007/0294346 A1 | 12/2007 | Moore et al. | |
| 2008/0218582 A1 | 9/2008 | Buckler | |
| 2008/0246834 A1 | 10/2008 | Lunde et al. | |
| 2008/0267282 A1 | 10/2008 | Kalipatnapu et al. | |
| 2008/0316297 A1 | 12/2008 | King et al. | |
| 2009/0045987 A1 | 2/2009 | Cho et al. | |
| 2009/0079811 A1 | 3/2009 | Brandt | |
| 2009/0164575 A1 | 6/2009 | Barbeau et al. | |
| 2009/0174764 A1 | 7/2009 | Chadha et al. | |
| 2010/0091086 A1 | 4/2010 | Hagen | |
| 2010/0141655 A1 | 6/2010 | Belinsky et al. | |
| 2010/0271457 A1 | 10/2010 | Thapa | |
| 2010/0302446 A1 | 12/2010 | Mauchly et al. | |
| 2010/0309984 A1 | 12/2010 | Liu et al. | |
| 2011/0018962 A1 | 1/2011 | Lin et al. | |
| 2011/0040562 A1 | 2/2011 | Doyle et al. | |
| 2011/0074910 A1 | 3/2011 | King et al. | |
| 2011/0074913 A1 | 3/2011 | Kulkarni et al. | |
| 2011/0131144 A1 | 6/2011 | Ashour et al. | |
| 2011/0141221 A1 | 6/2011 | Satterlee et al. | |
| 2011/0205332 A1 | 8/2011 | Jeong et al. | |
| 2011/0206113 A1 * | 8/2011 | Bivolarsky et al. | 375/240.02 |
| 2012/0327172 A1 | 12/2012 | El-Saban et al. | |
| 2013/0088600 A1 | 4/2013 | Wu et al. | |
| 2013/0176383 A1 | 7/2013 | Satterlee et al. | |
| 2013/0346564 A1 | 12/2013 | Warrick et al. | |

FOREIGN PATENT DOCUMENTS

| | | |
|---|---|---|
| WO | WO2010111275 | 9/2010 |
| WO | WO2011150128 | 12/2011 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Cisco WebEx, "Share Ideas With Anyone, Anywhere—Online", Cisco WebEx Meeting Center, Product Overview, 2011 (2 pp).

(56) References Cited

OTHER PUBLICATIONS

Cisco, "Cisco TelePresence Product Portfolio", Brochure, 2011 (5 pp).

Bankoski et al. "Technical Overview of VP8, An Open Source Video Codec for the Web". Dated Jul. 11, 2011.

Bankoski et al. "VP8 Data Format and Decoding Guide; draft-bankoski-vp8-bitstream-02" Network Working Group. Internet-Draft, May 18, 2011, 288 pp.

Firestone, S., et al. "Lip Synchronization in Video Conferencing." Voice and Video Conferencing Fundamentals. Cisco Systems, Inc. Mar. 2007.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Overview; VP7 Data Format and Decoder. Version 1.5. On2 Technologies, Inc. Dated Mar. 28, 2005.

Schulzrinne, H., et al. RTP: A Transport Protocol for Real-Time Applications, RFC 3550. The Internet Society. Jul. 2003.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Babonneau, et al., "SSRC Multiplexing for Unicast and Multicast RTP Sessions," Network Working Group Internet-Draft (IETF Trust 2010).

\* cited by examiner

SYSTEM, METHOD AND APPARATUS FOR MULTIPOINT VIDEO TRANSMISSION

TECHNICAL FIELD

The present invention relates in general to encoding and decoding video data.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

In multipoint video transmission in applications such as video-on-demand and video conferencing, several endpoints need to access the same video stream simultaneously. There is often a wide range of available bandwidth capacities between the endpoint transmitting and the different endpoints receiving the video stream. In some systems, simulcasting has been utilized to transmit the same video stream to two or more endpoints having different bandwidth capacities. In simulcasting, for example, the same video stream is encoded at different qualities and each endpoint receives one of the different quality video streams depending on the endpoint's respective bandwidth capacity. Since these encoded video streams are generated from the same video stream, the video stream may not be encoded and transmitted in a manner that efficiently exploits common data shared in the resulting encoded video streams.

SUMMARY

A method of transmitting a video bitstream to a first and at least a second endpoint with varying bandwidth capacities is disclosed herein. The method includes, according to one aspect, identifying bandwidth capacities of the first and second endpoints, the second endpoint having less bandwidth capacity than the first endpoint and encoding at least a portion of the video bitstream to generate at least one version of a first data partition and a plurality of versions of at least a second data partition. The plurality of versions of the second data partition include at least one high quality version and at least one low quality version of the second data partition. The method also includes transmitting the at least one version of the first partition and the at least one high quality version of the second partition to the first endpoint and transmitting the at least one low quality version of the second partition to the second endpoint.

Also disclosed herein is an apparatus for transmitting a video bitstream to a first and at least a second endpoint with varying bandwidth capacities. The apparatus includes, according to one aspect, a memory and at least one processor configured to execute instructions stored in the memory to identify bandwidth capacities of the first and second endpoints. The second endpoint has less bandwidth capacity than the first endpoint. The at least one processor is also configured to execute instructions stored in the memory to encode at least a portion of the video bitstream to generate at least one version of a first data partition and a plurality of versions of at least a second data partition. The plurality of versions of the second data partition include at least one high quality version and at least one low quality version of the second data partition. Further, the at least one processor is configured to transmit the at least one version of the first partition and the at least one high quality version of the second partition to the first endpoint and transmit the at least one low quality version of the second partition to the second endpoint.

Further, disclosed herein is a method of transmitting a video bitstream that has been partitioned into a first data partition and at least a second data partition, the video bitstream to be sent to a first and at least a second endpoint with varying bandwidth capacities. The method includes, according to one aspect, identifying the first and second endpoints. The second endpoint has less bandwidth capacity than the first endpoint. The method also includes receiving at least one encoded version of a first data partition and a plurality of encoded versions of at least a second data partition. The encoded plurality of versions of the second data partition include at least one encoded high quality version and at least one encoded low quality version of the second data partition. Further, the method includes transmitting the at least one encoded version of the first partition and the at least one encoded high quality version to the first endpoint and transmitting the at least one encoded low quality version of the second partition to the second endpoint.

Also disclosed herein is a method of receiving a video bitstream in a system having a first, a second and at least a third endpoint with varying bandwidth capacities with a video bitstream that has been partitioned into a first data partition and at least a second data partition from the third endpoint and the second endpoint having less bandwidth capacity than the first endpoint. The method includes, according to one aspect obtaining, at the second endpoint, a low quality version of the second partition having less data than a high quality version of the second partition transmitted to the first endpoint and decoding the low quality version of second partition obtained at the second endpoint.

A system for transmitting a video bitstream to endpoints with varying bandwidth capacities is also disclosed herein. The system includes, according to one aspect, a first endpoint, a second endpoint and a third endpoint. The second endpoint has less bandwidth capacity than the first endpoint. The third endpoint is configured to encode at least a portion of the video bitstream to generate at least one version of a first data partition and a plurality of versions of at least a second data partition. The plurality of versions of the second data partition including at least one high quality version and at least one low quality version of the second data partition. The third endpoint is also configured to transmit the at least one version of the first partition and the at least one high quality version of the second partition to the first endpoint and transmit the at least one low quality version of the second partition to the second endpoint.

These and other embodiments will be described in additional detail hereafter.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
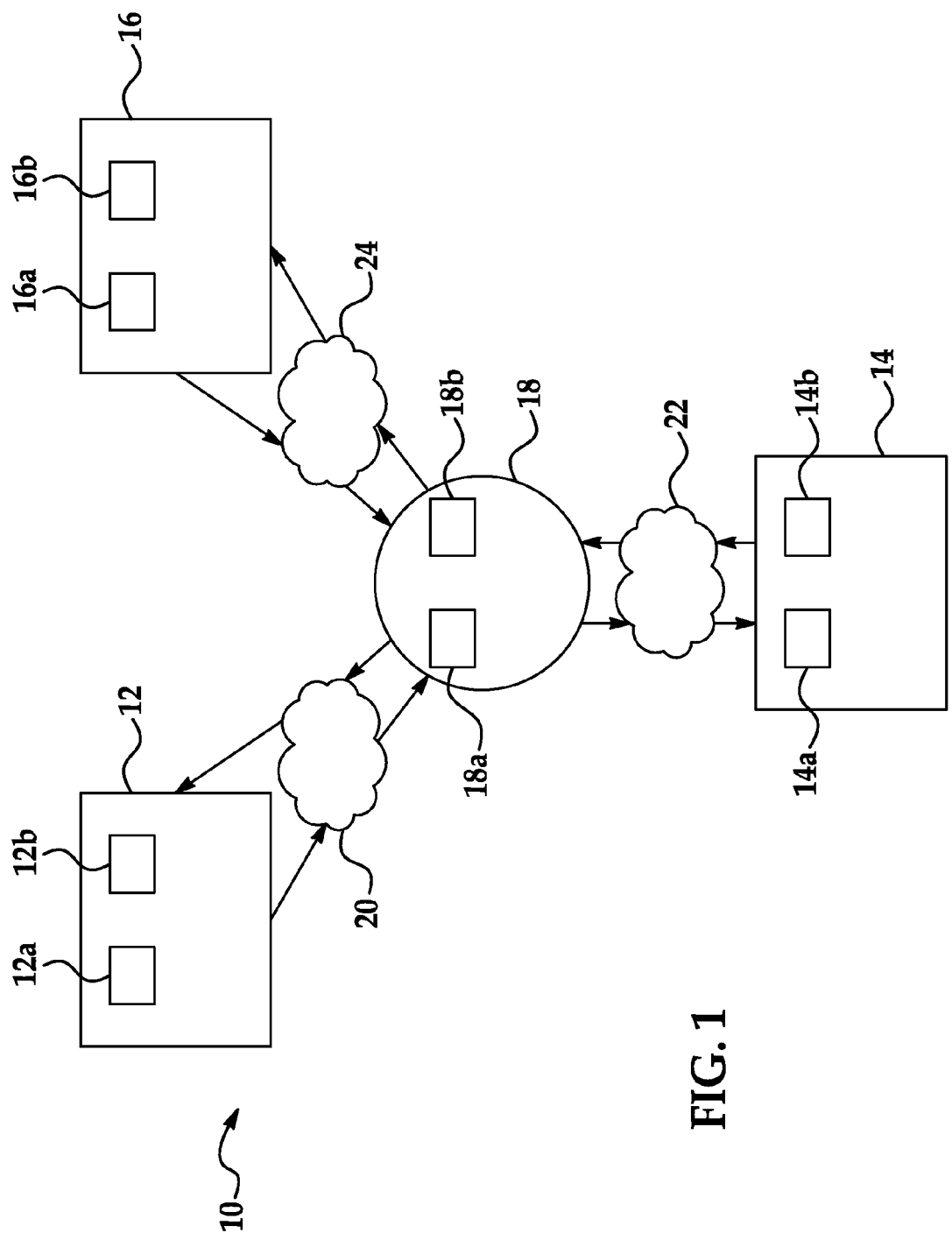
FIG. 1 is a diagram of a multipoint video transmission system in accordance with one embodiment.

FIG. 1 is a diagram of a multipoint video transmission system 10 for transmitting and receiving a video stream. System 10 can include three or more endpoints 12, 14 and 16 in communication with an intermediary point such as server 18. For ease of the reader's understanding of the embodiments, endpoint 12 will be referred to as the endpoint transmitting the video stream and endpoints 14 and 16 will be referred to as the endpoints receiving the video stream. Specifically, the video stream can be encoded by an encoder in endpoint 12 and the encoded video stream can be decoded by a decoder in endpoint 14 and a decoder in endpoint 16. However, endpoint 12 can also receive and decode an encoded video stream similar to what will be described below with respect to endpoints 14 and 16. Likewise, endpoints 14 and 16 can also encode and transmit a video stream similar to what will be described with respect to endpoint 12.

A network 20 connects endpoint 12 and server 18 to permit transmission of the encoded video stream from endpoint 12 to server 18. A network 22 connects server 18 to endpoint 14 and a network 24 connects server 18 to endpoint 16 to permit distribution of the encoded video stream to endpoint 14 and endpoint 16, respectively. Networks 20, 22 and 24 may be the Internet. Networks 20, 22 and 24 can also be a local area network (LAN), wide area network (WAN), virtual private network (VPN), cellular network, or any other network to permit the transfer of the video stream. Each of networks 20, 22 and 24 can be the same or can be different from one another.

Endpoints 12, 14 and 16 can each be, for example, a computer having an internal configuration of hardware including a processor such as a central processing unit (CPU) 12a, 14a and 16a, respectively, and a memory 12b, 14b and 16b, respectively. CPUs 12a, 14a and 16a can be controllers for controlling the operations of endpoints 12, 14 and 16, respectively. CPU 12a is connected to memory 12b by, for example, a memory bus. Similarly, CPU 14a can be connected to memory 14b and CPU 16a can be connected to memory 16b using memory buses. Memories 12b, 14b and 16b can be random access memory (RAM) or any other suitable memory device. Memories 12b, 14b and 16b can store data and program instructions which are used by CPUs 12a, 14a and 16a, respectively. Other suitable implementations of endpoints 12, 14 and 16 are possible.

Server 18 can be, for example, a computer having an internal configuration of hardware including a processor such as a central processing unit (CPU) 18a and a memory 18b. CPU 18a can be a controller for controlling the operations of server 18. CPU 18a is connected to memory 18b by, for example, a memory bus. Memory 18b can be random access memory (RAM) or any other suitable memory device. Memory 18b can store data and program instructions which are used by the CPU 18a. Other suitable implementations of server 18 are possible.

In some embodiments, system 10 may not include server 18. In these embodiments, the encoded video stream can be transmitted directly from endpoint 12 to endpoint 14 via a network (similar to networks 20, 22 or 24). The encoded video stream can also be transmitted directly from endpoint 12 to endpoint 16 via another network (similar to networks 20, 22 or 24). In other embodiments, system 10 can include more than one server 18. For example, endpoint 12 and endpoint 14 can be connected using one server and endpoint 12 and endpoint 16 can be connected using another server. Further, for example, each endpoint 12, 14 and 16 can be connected to its own individual server and the individual servers can relay the video stream between each other. Thus, for example, a sending endpoint (e.g., endpoint 12) can send the encoded video stream to the server corresponding to the sending endpoint, which in turn can relay the video stream to the server corresponding to a receiving endpoint (e.g., endpoint 14). The server corresponding to the receiving endpoint can in turn send the encoded video stream to the receiving endpoint.

Although system 10, as illustrated, only includes three endpoints, any number of endpoints can be included in system 10. Further, other components can be included in system 10. Each endpoint can be connected to a display (not shown) to display a video stream before encoding and/or a video stream decoded by the decoder in the endpoint. The display can be implemented in various ways, including by a liquid crystal display (LCD) or a cathode-ray tube (CRT).

Other implementations of system 10 are possible. For example, a video stream can be encoded and then stored for transmission at a later time by endpoint 14 or endpoint 16 or any other device having a processor and memory. In another implementation, additional components can be added to the system 10. For example, in a videoconferencing application, a display and a video camera can be attached to endpoint 12 to capture the video stream to be encoded.

Figure 2:
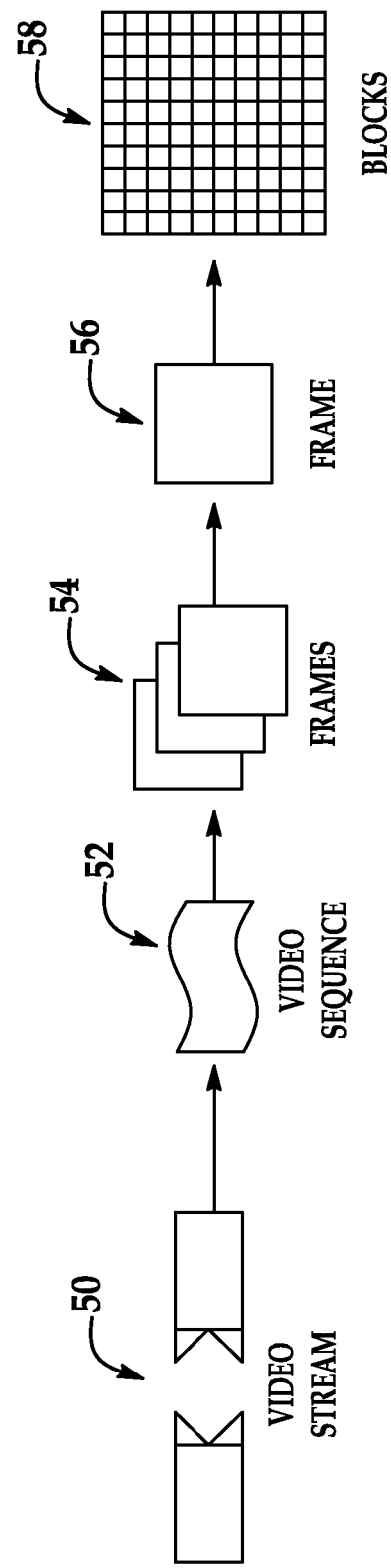
FIG. 2 is a diagram of a video stream that can be encoded and decoded by the system of FIG. 1.

FIG. 2 is a diagram of an exemplary video stream 50 to be encoded and decoded in system 10. Video coding formats, such as VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks 58 (e.g. macroblocks), which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups.

As discussed previously, some current systems utilize simulcasting in multipoint video transmission to transmit the same video simultaneously to two or more endpoints having different bandwidth capacities. For example, in current systems having a configuration similar to that illustrated in FIG. 1, if endpoint 12 has an upstream maximum bandwidth capacity of 4000 kbps to server 18, endpoint 14 has a downstream maximum bandwidth capacity of 8000 kbps from server 18 and endpoint 16 has a downstream maximum bandwidth capacity of 1000 kbps from server 18, then endpoint 12 can allocate 3000 kbps to endpoint 14 and can allocate 1000 kbps to endpoint 16. Endpoint 12 can also allocate different portions of the upstream bandwidth capacity to endpoints 14 and 16 (e.g. 2000 kbps to endpoint 14 and 2000 kbps to endpoint 16).

As such, endpoint 12 encodes two copies of a video stream (e.g. video stream 50), with each copy being encoded at a different quality. The copy of the video stream encoded at 3000 kbps will be of a higher quality and will be sent to endpoint 14 and the copy of the encoded video stream encoded at 1000 kbps will be of a lower quality and will be sent to endpoint 16. Because the two copies are created from the same video stream, there is common data in both the higher quality and lower quality streams. However, this common data is not considered during the simulcast encoding process and the same data may be unnecessarily sent in both the higher quality stream and lower quality stream. Common data can be information that is the same. However, common data also includes information that is similar. Sending this additional common data increases the upstream bandwidth consumption from endpoint 12.

The embodiments disclosed herein, do not send all or part of this common data, which reduces the upstream bandwidth consumption from endpoint 12. To do this, according to one embodiment, video stream 50 can be partitioned into two or more partitions. During encoding, a single version of the first partition can be encoded and two versions of the second partition can be encoded. Each of the versions of the partitions can be encoded and decoded separately. If there are additional endpoints with varying bandwidth capacities from endpoint 14 and 16, additional versions of the second partition can also be encoded as desired or required. The high quality stream can be composed of the single version of the first partition and a first high quality version of the second partition. The low quality stream can be composed of the single version of the first partition and a second low quality version of the second partition. Only one copy of the single version is, however, transmitted from endpoint 12. The single version of the first partition can contain data that is common to both the higher quality stream and lower quality stream. As such, it is unnecessary to transmit two copies of the common data.

Figure 3:
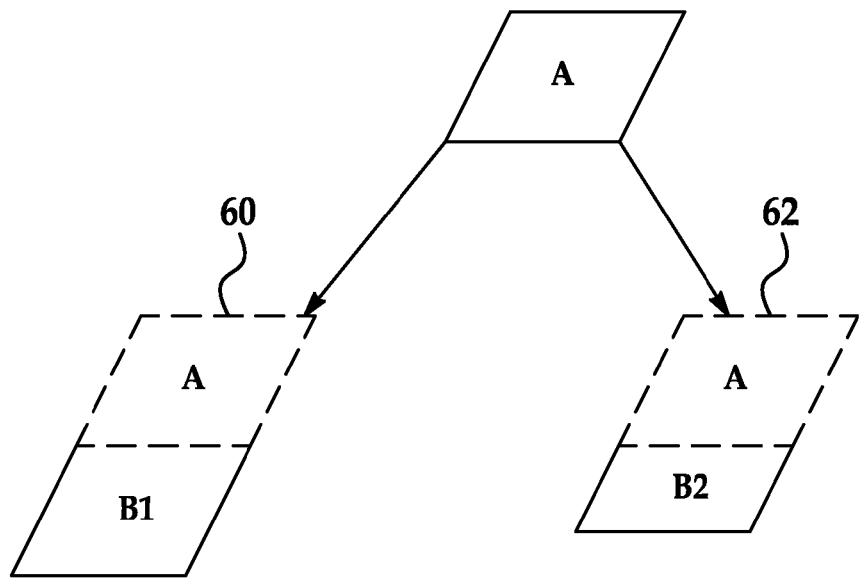
FIG. 3 is a schematic diagram of a high and low quality video stream partitioned for transmittal in the system of FIG. 1.

FIG. 3 illustrates an encoded higher quality stream 60 and an encoded lower quality stream 62 formed from an input video stream (e.g. video stream 50). Higher quality stream 60 contains a single encoded version of a first partition (hereinafter "partition A") and a first encoded version of a second partition (hereinafter "partition B1"). Lower quality stream 62 contains partition A and a second version of the second partition (hereinafter "partition B2"). Partition A of higher quality stream 60 and partition A of lower quality stream 62 contain the same data. As such, the single version of partition A, partition B1 and partition B2 can be transmitted from endpoint 12 to intermediary point 18. Intermediary point 18 in turn can send partition A and partition B1 to endpoint 14 and can send partition A and partition B2 to endpoint 16.

More specifically, video stream 50 can be divided into two or more partitions with one of the partitions (e.g. partition A) containing the prediction mode parameters and motion vectors (hereinafter "prediction information") for all macroblocks in each frame of the video stream. The remaining partitions (e.g. partition B1 or partition B2) contain the transform coefficients for the residuals (hereinafter "residual information"). These transform coefficients (e.g. discrete cosine transform coefficients) for the residuals are what are added to the predicted block values during the decoding process. The partition containing the prediction information can be decoded without the remaining residual partitions. Higher quality stream 60 and/or lower quality stream 62 can also have more than one partition containing additional residual information. Because partition B1 is of a higher quality than partition B2, partition B1 will generally have more data than partition B2.

Video stream 50 can also be partitioned according to other techniques. For example, the residual information can be contained in the first partition rather than the second partition. The prediction information may also be packed into more than one partition. Further, video stream 50 can be partitioned based on factors other than or in addition to prediction information and residual information.

Figure 4:
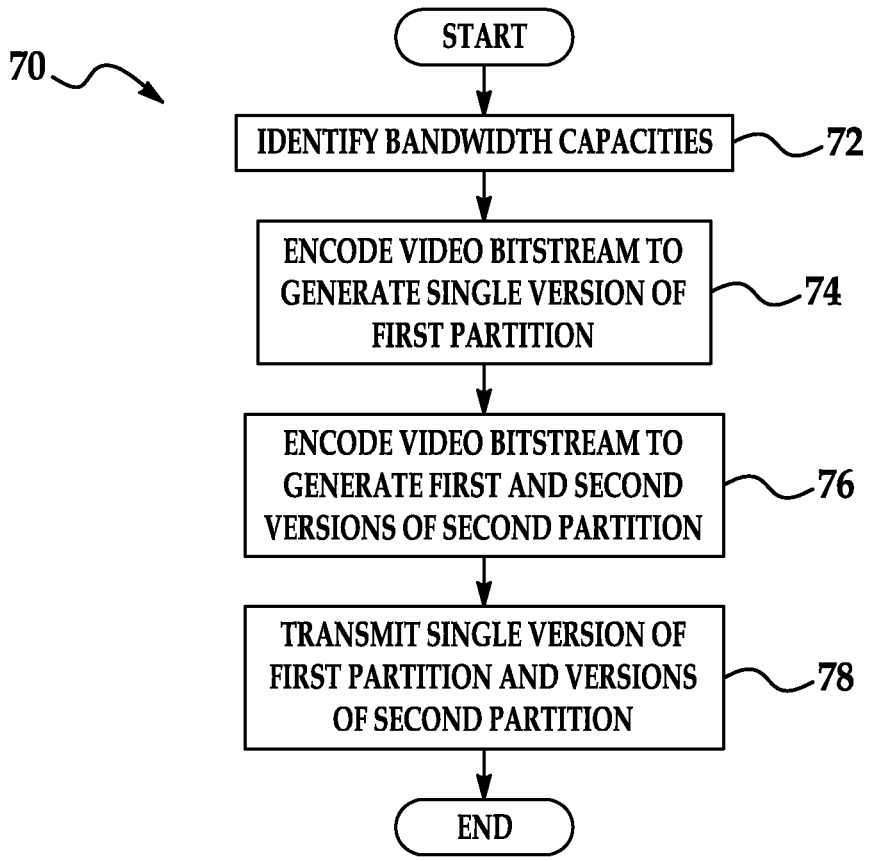
FIG. 4 is an exemplary method of video transmission from an endpoint in the system of FIG. 1.

FIG. 4 is an exemplary method 70 of video transmission from, for example, endpoint 12. Beginning at block 72, the sending endpoint can identify the bandwidth capacities for the endpoints (e.g. endpoints 14 and 16) that are to receive the encoded video stream. The bandwidth capacities of endpoints 14 and 16 can be sent by endpoints 14 and 16 without being requested by endpoint 12 or on request by endpoint 12. The bandwidth capacities can also be identified by other possible techniques. For example, the bandwidth capacities can be predetermined and preset in endpoint 12. The bandwidth capacities can be utilized to determine the manner in which video stream 50 should be encoded and/or the degree of compression. Generally, if endpoint 14 has a high bandwidth capacity, video stream 50 can be encoded with a lower degree of compression. Conversely, if endpoint 16 has a low bandwidth capacity, video stream 50 can be encoded to meet the low bandwidth constraint by having a higher degree of compression. Because endpoint 16 is receiving a more highly compressed version of video stream 50, the quality will generally be lower than the quality of the version sent to endpoint 14.

Once the bandwidth capacities have been determined, control moves to block 74 to encode video bitstream 50 to generate a single version of the first partition (e.g., partition A). Then, control moves to block 76 to encode video bitstream 50 to generate a first high quality version of a second partition (e.g., partition B1) and a second low quality version of a second partition (e.g., partition B2). Blocks 74 and 76 are illustrated separately in FIG. 4 to ease the reader's understanding of the embodiments, although generation of partition A, partition B1 and partition B2 can occur in a single encoding process. In some embodiments, however, generation of partition A, partition B1 and B2 can occur in separate encoding processes.

Since partition B2 is being sent to endpoint 16 having less bandwidth capacity, partition B2 will generally have less data (i.e. a reduced amount) than partition B1. Accordingly, the amount of data in partition B2 can be reduced during or subsequent to the encoding process. Some exemplary methods of reducing the amount of data include, for example, increasing the quantization size for partition B2 during the encoding process or down-sampling partition B2. In some instances, the size of video bitstream 50 can be reduced by, for example, frame-dropping selected, pre-determined or random frames, which can in turn reduce the size of partition B2 once generated.

With respect to increasing the quantization size, for example, a first set of quantization levels can be used to generate the first version of the second partition and a second set of quantization levels can be used to generate the second version of the second partition during the encoding process (i.e., block 76). The number of quantization levels in the first set can be greater than the number of quantization levels in the second set. A set having a smaller number of quantization levels can provide greater data reduction than a set having a larger number of quantization levels. Accordingly, to illustrate with a simple example, if the first set has eight quantization levels [1, 6, 9, 10, 15, 21, 22, 24] and the second set has three quantization levels [1, 5, 22], the second set can provide greater data reduction. As such, the second version of the second partition that uses the second set of quantization levels can have a lower bit rate (i.e. lower quality stream) than the first version of the second partition, which uses the first set of quantization levels.

At block 80, once partition A and partitions B1 and B2 have been encoded, they can be transmitted to intermediary point 18.

Figure 5:
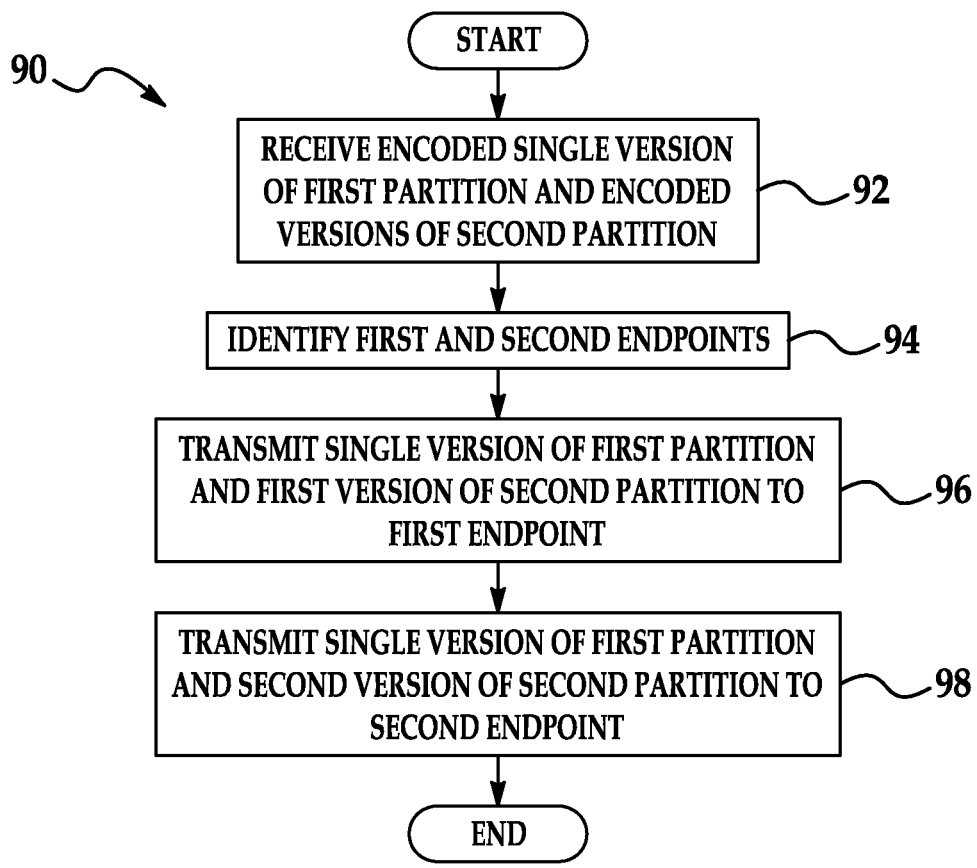
FIG. 5 is an exemplary method of video transmission from an intermediary point in the system of FIG. 1.

FIG. 5 is an exemplary method 90 of video transmission from, for example, intermediary point 18. Beginning at block 92, intermediary point 18 can receive the encoded single version of the first partition (partition A) and the encoded versions of the second partition (partitions B1 and B2). At block 94, intermediary point 18 can identify the first and second endpoints that are to receive the encoded versions of video bitstream 50. Thus, in this example, intermediary point 18 can identify that the first endpoint is endpoint 14, which should receive partition A and partition B1 and can identify that the second endpoint is endpoint 16, which should receive partition A and partition B2.

Intermediary point 18 can, for example, make the identification of the endpoints based on information received from endpoint 12. This information can be contained in the encoded versions of video bitstream 50 or can be sent separate from the encoded versions of video bitstream. Alternatively, intermediary point can be preprogrammed to identify which endpoints receive which encoded versions. Other suitable techniques for identifying the endpoints are also possible. For example, intermediary server 18 can independently make the determination without information from endpoint 12. For example, intermediary server can request that endpoints 14 and 16 send their respective bandwidth capacities. Based on this information, intermediary point 18 can determine which encoded versions of video bitstream 50 should be sent to which endpoints.

Once intermediary point 18 has identified the endpoints such as endpoints 14 and 16, it can transmit the single version of the first partition (partition A) and the first version of the second partition (partition B1) to endpoint 14 at block 96. Similarly, at block 98, intermediary point 18 can transmit the single version of the first partition (partition A) and the second version of the second partition (partition B2) to endpoint 16. As discussed previously, partition A sent to endpoint 14 and partition A sent to endpoint 16 are the same. Since intermediary point 18 only receives a single version of partition A, intermediary point 18 can duplicate partition A so that it can send it to more than one endpoint. Once endpoints 14 and 16 receive their respective partitions, each can perform a decoding process on the data.

In other embodiments, rather than send a single encoded version of the first partition, two versions (e.g. a first version and a second version) of the first partition can be generated with only one of the versions, for example, the first version sent to intermediary point 18. At intermediary point 18, the first version of the first partition can be used to generate the second version of the first partition.

Figure 6:
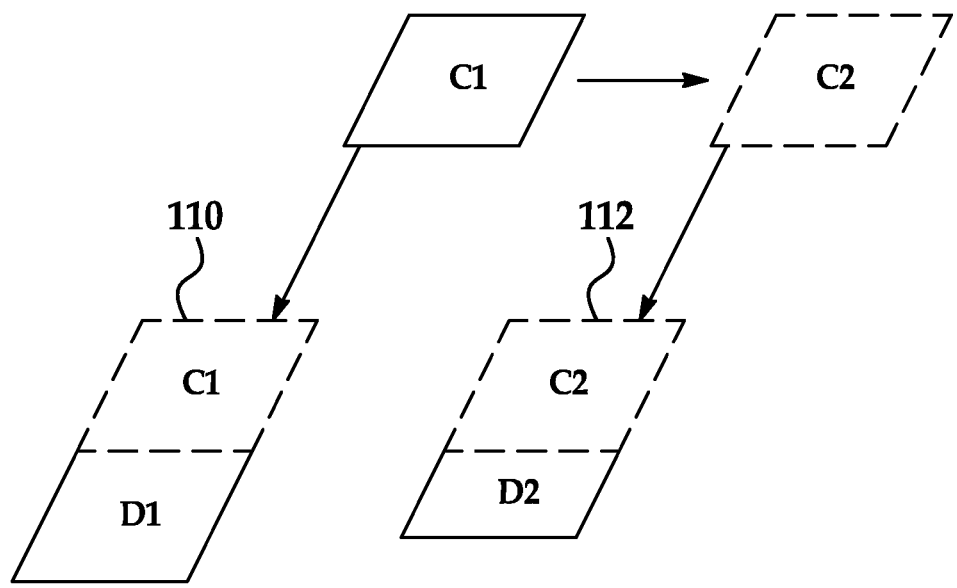
FIG. 6 is an exemplary method of video receipt at an endpoint in the system of FIG. 1.

FIG. 6 illustrates an encoded higher quality stream 110 and an encoded lower quality stream 112 formed from an input video stream (e.g. video stream 50). Higher quality stream 110 contains a first encoded version of a first partition (hereinafter "partition C1") and a first encoded high quality version of a second partition (hereinafter "partition D1"). Lower quality stream 62 contains a second encoded version of the first partition (hereinafter "partition C2") and a second low quality version of the second partition (hereinafter "partition D2"). Similar to as discussed previously, partitions C1 and C2 can contain the prediction information for all macroblocks in each frame of the video stream and partitions D1 or partition D2 contain the residual information. These transform coefficients (e.g. discrete cosine transform coefficients) for the residuals are what are added to the predicted block values during the decoding process.

Rather than partition C1 and partition C2 containing the same data as discussed above with respect to the embodiments discuss previously, partition C2 can be created from partition C1. For example, partition C1 can be downsampled to create partition C2. More specifically, since the first partition can contain the motion vectors, the motion vectors can be downsampled. Since partition C2 is being sent to endpoint 16 having less bandwidth capacity, partition C2 will generally have less data than partition C1.

Downsampling of partition C1 can occur during the encoding process of partition C1. More specifically, in one example, partition C1 can be downsampled after prediction information is calculated and before residual information is calculated. In other embodiments, partition C1 can be downsampled after both prediction information and residual information are calculated. Other techniques of generating the second version of the first partition are also possible.

When transmitting higher quality stream partition C1, partition D1 and partition D2 can be transmitted from endpoint 12 to intermediary point 18 without transmitting partition C2. Intermediary point 18 can then create partition C2 by decoding partition C1 and downsampling the motion vectors. In turn, intermediary point 18 can send partition C1 and partition D1 to endpoint 14 and can send partition C2 and partition D2 to endpoint 16. In other embodiments, partition C2, rather than partition C1 is transmitted to intermediary point 18. In turn, partition C2 can be upsampled to create partition C1.

Figure 7:
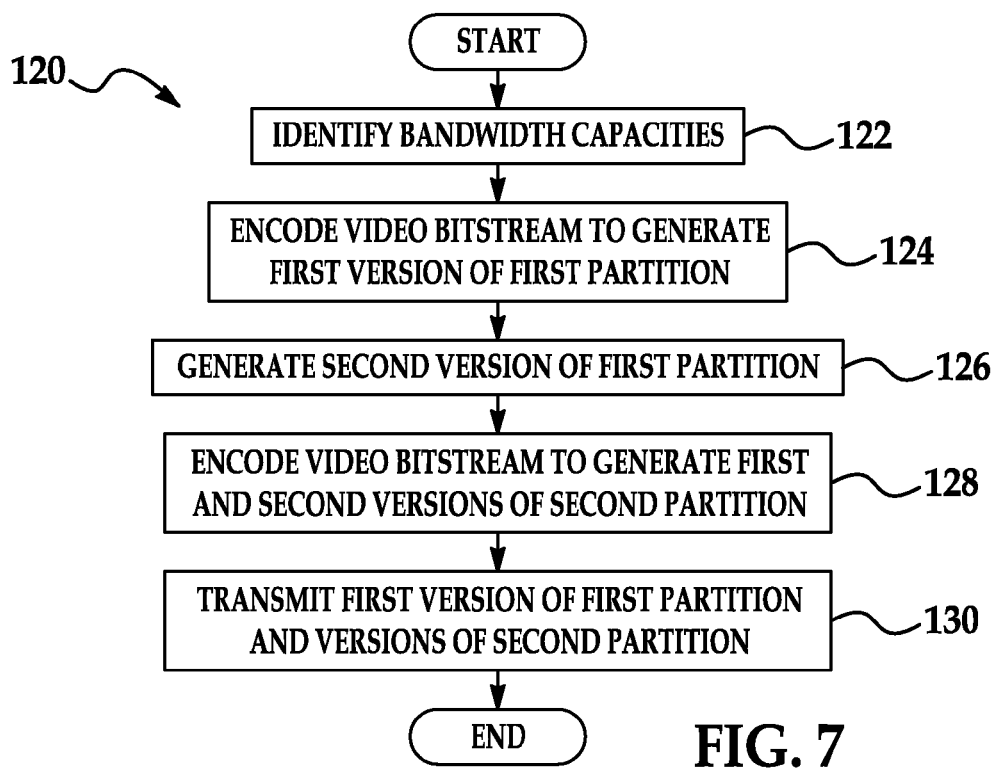
FIG. 7 is another exemplary method of video transmission from the endpoint in the system of FIG. 1.

FIG. 7 is another exemplary method 120 of video transmission from, for example, endpoint 12. Beginning at block 122, endpoint can identify the bandwidth capacities for the endpoints (e.g. endpoints 14 and 16) that are to receive the encoded video stream similar to that described above at block 72 of FIG. 4. Once the bandwidth capacities have been determined, control moves to block 124 to encode video bitstream 50 to generate a first version of a first partition (e.g., partition C1). Then, at block 126, a second version of the first partition (e.g., partition C2) can be generated. As discussed previously, partition C2 can be generated by, for example, downsampling partition C1.

Once partition C2 has been generated, control moves to block 128 to encode video bitstream to generate a first high quality version of a second partition (e.g., partition D1) and a second low quality version of the second partition (e.g., partition D2). As discussed previously, the second version of the first partition can be used to encode the second version of the second partition. Blocks 124 and 126 are illustrated separately in FIG. 7 to ease the reader's understanding of the embodiments, although generation of partition C1, partition D1 and partition D2 can occur in a single encoding process. Thus, for example, partition C1 and partition D1 can be generated and once partition C2 is generated (i.e. block 126), partition D2 can be generated. In some embodiments, however, generation of these partitions can occur in separate encoding processes.

At block 130, once partition C1 and partitions D1 and D2 have been encoded, they can be transmitted to intermediary point 18 without transmitting partition C2. As discussed previously, transmitting partitions C1, D1 and D2 without transmitting partition C2 reduces the upstream bandwidth consumption from endpoint 12 to intermediary point 18.

Figure 8:
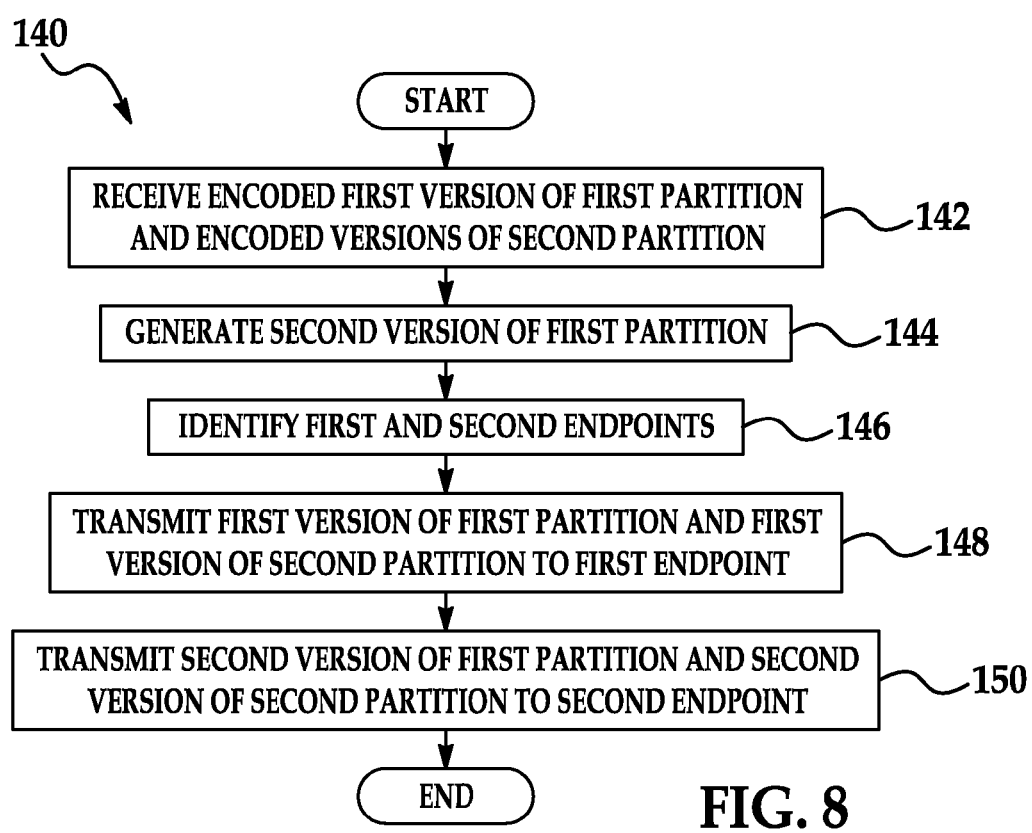
FIG. 8 is an exemplary method of video transmission from the intermediary point in the system of FIG. 1.

FIG. 8 is another exemplary method 140 of video transmission from, for example, intermediary point 18. Beginning at block 142, intermediary point 18 can receive the encoded first version of the first partition (e.g., partition C1) and the encoded versions of the second partition (partitions D1 and D2). At block 144, the second version of the first partition can be generated. For example, as discussed previously, intermediary server 18 can decode partition C1 and downsample the decoded partition C1 to create partition C2. Other techniques for creating a second version of the first partition are also possible.

At block 146 intermediary point 18 can identify the first and second endpoints that are to receive the encoded versions of video bitstream 50 similar to that described previously at block 94 of FIG. 5. Thus, in this example, intermediary point 18 can identify that the first endpoint is endpoint 14, which should receive partition C1 and partition D1 and can identify that the second endpoint is endpoint 16, which should receive partition C2 and partition D2.

Once intermediary point 18 has identified the endpoints such as endpoints 14 and 16, it can transmit the first version of the first partition (partition C1) and the first version of the second partition (partition D1) to endpoint 14 at block 148. Similarly, at block 150, intermediary point 18 can transmit the second version of the first partition (partition C2) and the second version of the second partition (partition D2) to endpoint 16. Once endpoints 14 and 16 receive their respective partitions, each can perform a decoding process on the data.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of endpoints 12, 14 or 16 or intermediary point 18 (and the algorithms, methods, instructions etc. stored thereon and/or executed thereby) are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any of the foregoing, either singly or in combination. The terms "signal" and "data" are used interchangeably.

Further, portions of endpoints 12, 14 or 16 or intermediary point 18 do not necessarily have to be implemented in the same manner. Endpoints 12, 14 or 16 or intermediary point 18 can be implemented in whole or in part by one or more computers, servers, processors or any other suitable computing devices or systems that can carry out any of the embodiments described herein. In one embodiment, for example, endpoints 12, 14 or 16 or intermediary point 18 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein.

Further, all or a portion of embodiments of the present invention can take the form of a computer program product accessible from, for example, a computer-usable or computer-readable medium. A computer-usable or computer-readable medium can be any device that can, for example, contain, store, communicate, and/or transport the program for use by or in connection with any computing system or device. The medium can be, for example, an electronic, magnetic, optical, electromagnetic, or a semiconductor device. Other suitable mediums are also available.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method of transmitting a video bitstream to a first endpoint and at least a second endpoint with varying bandwidth capacities, comprising:
    separating a portion of the video bitstream into a first data partition and a second data partition, wherein the first data partition has prediction information for the portion of the video bitstream and the second data partition includes residual data information for the portion of the video bitstream;
    encoding the first data partition as encoded common data;
    encoding the second data partition as encoded high quality data at a first bitrate;
    encoding the second data partition as encoded low quality data at a second bitrate that is less than the first bitrate;
    transmitting a single copy of the encoded common data to an intermediary point that duplicates the encoded common data and transmits the encoded common data to the first endpoint and the second endpoint;
    transmitting the encoded high quality data to the first endpoint; and
    transmitting the encoded low quality data to the second endpoint,
    wherein the encoded common data and the encoded high quality data are combinable by a decoding process at the first endpoint to define a high quality representation of the portion of the video bitstream, the encoded common data and the encoded low quality data are combinable by a decoding process at the second endpoint to define a low quality representation of the portion of the video bitstream, and the encoded common data cannot be decoded to define a representation of the video bitstream without at least one of the encoded high quality data or the encoded low quality data.

2. The method of claim 1, wherein the prediction information includes motion vectors and prediction modes.

3. The method of claim 1, wherein the encoded common data is a first version of the first data partition and the first version of the first data partition is the only version of the first data partition generated.

4. The method of claim 1, wherein the encoded common data is a first version of the first data partition, the method further comprising:
    down-sampling the first version of the first data partition to form a second version of the first data partition, the second version of the first data partition having a resolution less than an original resolution of the first version of the first data partition; and
using the second version of the first data partition to generate the at least one low quality version of the second data partition.

5. The method of claim 4, further comprising:
transmitting the first version and not the second version of the first data partition to an intermediary point.

6. The method of claim 1, wherein encoding the second data partition as encoded low quality data comprises:
reducing an amount of data in the encoded low quality data.

7. The method of claim 6, wherein reducing the amount of data includes at least one of increasing quantization size, down-sampling and frame-dropping.

8. The method of claim 1, wherein encoding the second data partition as encoded high quality data is performed using a first set of quantization levels and encoding the second data partition as encoded low quality data is performed using a second set of quantization levels, wherein the number of quantization levels in the first set are greater than the number of quantization levels in the second set.

9. An apparatus for transmitting a video bitstream to a first endpoint and at least a second endpoint with varying bandwidth capacities, comprising:
a memory;
at least one processor configured to execute instructions stored in the memory to:
separate a portion of the video bitstream into a first data partition and a second data partition, wherein the first data partition has prediction information for the portion of the video bitstream and the second data partition includes residual data information for the portion of the video bitstream;
encode the first data partition as encoded common data;
encode the second data partition as encoded high quality data at a first bitrate;
encode the second data partition as encoded low quality data at a second bitrate that is less than the first bitrate;
transmit a single copy of the encoded common data to an intermediary point that duplicates the encoded common data and transmits the encoded common data to the first endpoint and the second endpoint;
transmit and the encoded high quality data to the first endpoint; and
transmit and the encoded low quality data to the second endpoint,
wherein the encoded common data and the encoded high quality data are combinable by a decoding process at the first endpoint to define a high quality representation of the portion of the video bitstream, the encoded common data and the encoded low quality data are combinable by a decoding process at the second endpoint to define a low quality representation of the portion of the video bitstream, and the encoded common data cannot be decoded to define a representation of the video bitstream without at least one of the encoded high quality data or the encoded low quality data.

10. The apparatus of claim 9, wherein the prediction information includes motion vectors and prediction modes.

11. The apparatus of claim 9, wherein the encoded common data is a first version of the first data partition and the first version of the first data partition is the only version of the first data partition generated.

12. The apparatus of claim 9, wherein the encoded common data is a first version of the first data partition, and the at least one processor is further configured to execute instructions stored in the memory to:
down-sample the first version of the first data partition to form a second version of the first data partition, the second version of the first data partition having a resolution less than an original resolution of the first version of the first data partition; and
use the second version of the first data partition to generate the at least one low quality version of the second data partition.

13. The apparatus of claim 9, wherein the at least one processor is further configured to execute instructions stored in the memory to:
reduce an amount of data in the encoded low quality data.

14. The apparatus of claim 9, wherein the processor encodes the second data partition as encoded high quality data using a first set of quantization levels and the processor encodes the second data partition as encoded low quality data using a second set of quantization levels, wherein the number of quantization levels in the first set are greater than the number of quantization levels in the second set.

15. A method of transmitting a portion of a video bitstream that has been partitioned into a first data partition that includes prediction information for the portion of the video bitstream and at least a second data partition that includes residual data information for the portion of the video bitstream, the video bitstream to be sent to a first endpoint and at least a second endpoint with varying bandwidth capacities, comprising:
receiving, from a sending endpoint, a single copy of an encoded version of the first data partition as encoded common data;
receiving, from the sending endpoint, an encoded version of the second data partition as encoded high quality data at a first bitrate;
receiving, from the sending endpoint, an encoded version of the second data partition as encoded low quality data at a second bitrate that is less than the first bitrate;
duplicating the single copy of the encoded common data as a first copy of the encoded common data and a second copy of the encoded common data;
transmitting the first copy of the encoded common data to the first endpoint;
transmitting the second copy of the encoded common data to the second endpoint;
transmitting the encoded high quality data to the first endpoint; and
transmitting the encoded low quality data to the second endpoint,
wherein the encoded common data and the encoded high quality data are combinable by a decoding process at the first endpoint to define a high quality representation of the portion of the video bitstream, the encoded common data and the encoded low quality data are combinable by a decoding process at the second endpoint to define a low quality representation of the portion of the video bitstream, and the encoded common data cannot be decoded to define a representation of the video bitstream without at least one of the encoded high quality data or the encoded low quality data.

16. The method of claim 15, wherein the encoded common data is a first version of the first data partition, the method further comprising:
down-sampling the first version of the first data partition to form a second version of the first data partition; and
transmitting the second version of the first data partition to the second endpoint.

17. A system for transmitting a video bitstream to endpoints with varying bandwidth capacities, comprising:
a first endpoint;

a second endpoint; and a third endpoint configured to:

separate a portion of the video bitstream into a first data partition and a second data partition, wherein the first data partition has prediction information for the portion of the video bitstream and the second data partition includes residual data information for the portion of the video bitstream, encode the first data partition as encoded common data, encode the second data partition as encoded high quality data at a first bitrate, encode the second data partition as encoded low quality data at a second bitrate that is less than the first bitrate, transmit a single copy of the encoded common data to an intermediary point that duplicates the encoded common data and transmits the encoded common data to the first endpoint and the second endpoint, transmit the encoded high quality data to the first endpoint, and transmit the encoded low quality data to the second endpoint, wherein the encoded common data and the encoded high quality data are combinable by a decoding process at the first endpoint to define a high quality representation of the portion of the video bitstream, the encoded common data and the encoded low quality data are combinable by a decoding process at the second endpoint to define a low quality representation of the portion of the video bitstream, and the encoded common data cannot be decoded to define a representation of the video bitstream without at least one of the encoded high quality data or the encoded low quality data.

18. The system of claim 17, wherein the second endpoint has less bandwidth capacity than the first endpoint.

19. The method of claim 1, further comprising:

identifying bandwidth capacities of the first endpoint and the second endpoint, the second endpoint having less bandwidth capacity than the first endpoint.

20. The apparatus of claim 9, wherein the at least one processor is further configured to execute instructions stored in the memory to:

identify bandwidth capacities of the first endpoint and the second endpoint, the second endpoint having less bandwidth capacity than the first endpoint.

* * * * *